(12) United States Patent
Izumi et al.

(10) Patent No.: US 11,984,746 B2
(45) Date of Patent: *May 14, 2024

(54) POWER SUPPLY SYSTEM

(71) Applicant: TOYOTA JIDOSHA KABUSHIKI KAISHA, Toyota (JP)

(72) Inventors: Junta Izumi, Nagoya (JP); Kenji Kimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,664

(22) Filed: Jun. 28, 2022

(65) Prior Publication Data
US 2023/0063475 A1    Mar. 2, 2023

(30) Foreign Application Priority Data

Aug. 25, 2021  (JP) ................... 2021-136920

(51) Int. Cl.
| | |
|---|---|
| *H02J 7/00* | (2006.01) |
| *H02J 3/32* | (2006.01) |
| *H02M 7/537* | (2006.01) |
| *H02M 7/5387* | (2007.01) |

(52) U.S. Cl.
CPC .......... *H02J 7/0063* (2013.01); *H02J 7/0013* (2013.01); *H02J 7/0025* (2020.01); *H02M 7/537* (2013.01); *H02M 7/5387* (2013.01); *H02J 3/32* (2013.01); *H02J 2207/20* (2020.01); *Y02E 60/10* (2013.01)

(58) Field of Classification Search
CPC ........ H02J 7/0063; H02J 3/14; H02J 2207/20; H02J 3/32; H02J 7/0016; H02J 7/00712; H02J 7/007194; H02J 7/34; H02J 7/342; H02J 7/0013; H02J 7/0024; H02J 7/0025; Y02E 60/10; H01M 10/441; H02M 7/483

See application file for complete search history.

(56) References Cited

U.S. PATENT DOCUMENTS

| | | | |
|---|---|---|---|
| 10,644,537 B2* | 5/2020 | Krishnan | .............. H02J 7/0016 |
| 11,424,620 B2* | 8/2022 | Juang | ...................... H02J 7/007 |
| 2011/0254373 A1* | 10/2011 | Johnson | ................ H02M 7/483 |
| | | | 307/77 |
| 2017/0267115 A1 | 9/2017 | Unno et al. | |
| 2017/0366038 A1 | 12/2017 | Qin et al. | |

(Continued)

FOREIGN PATENT DOCUMENTS

| | | |
|---|---|---|
| JP | 2018-074709 A | 5/2018 |
| WO | 2017/223267 A1 | 12/2017 |
| WO | 2018/079664 A1 | 5/2018 |

OTHER PUBLICATIONS

U.S. Appl. No. 17/847,413, filed Jun. 23, 2022 on behalf of Junta Izumi et al.

(Continued)

*Primary Examiner* — Ryan Johnson
(74) *Attorney, Agent, or Firm* — Oliff PLC (57) ABSTRACT

A power supply system includes an alternating current sweep unit and a first power supply circuit, and each of a first U-phase battery string, a first V-phase battery string, a first W-phase battery string, and a first battery string includes a plurality of battery circuit modules connected in series, and each of the battery circuit modules includes a battery, output terminals, a first switch, and a second switch.

7 Claims, 8 Drawing Sheets

(56) References Cited

U.S. PATENT DOCUMENTS

| | | |
|---|---|---|
| 2018/0043789 A1 | 2/2018 | Goetz |
| 2019/0267896 A1 | 8/2019 | Goto et al. |
| 2020/0169080 A1 | 5/2020 | Yasoshima et al. |
| 2021/0249951 A1 | 8/2021 | Goto et al. |

OTHER PUBLICATIONS

U.S. Appl. No. 17/833,191, filed Jun. 6, 2022 on behalf of Junta Izumi et al.
U.S. Appl. No. 17/860,554, filed Jul. 8, 2022 on behalf of Junta Izumi et al.
Sep. 25, 2023 Office Action issued in U.S. Appl. No. 17/847,413.
Sep. 28, 2023 Office Action issued in U.S. Appl. No. 17/860,554.
Aug. 4, 2023 Notice of Allowance issued in U.S. Appl. No. 17/833,191.
Akagi H. et al. "A Battery Energy Storage System Based on a Multilevel Cascade PWM Converter", Power Electronics Conference, IEEE, Sep. 27, 2009, pp. 9-18.
Jan. 10, 2024 Notice of Allowance issued in U.S. Appl. No. 17/860,554.
Dec. 13, 2023 Notice of Allowance issued in U.S. Appl. No. 17/847,413.

\* cited by examiner

<< DRIVEN STATE >>

FIG. 5

<< DELAY PERIOD >>

FIG. 6

<< STOP PERIOD >>

POWER SUPPLY SYSTEM

CROSS-REFERENCE TO RELATED APPLICATION

This application claims priority to Japanese Patent Application No. 2021-136920 filed on Aug. 25, 2021, incorporated herein by reference in its entirety.

BACKGROUND

1. Technical Field

The present disclosure relates to a power supply system, in particular to a power supply system using a plurality of battery strings.

2. Description of Related Art

Japanese Unexamined Patent Application Publication No. 2018-074709 (JP 2018-074709 A) discloses a control circuit for controlling a battery string. The battery string includes a plurality of battery circuit modules connected to each other. Each battery circuit module included in the battery string includes a battery, a first switch connected in parallel to the battery, a second switch connected in series to the battery, and a first output terminal and a second output terminal to which a voltage of the battery is applied when the first switch is in an OFF state and the second switch is in an ON state. The control circuit can adjust the output voltage of the battery string to a desired magnitude by controlling the first switch and the second switch of each battery circuit module included in the battery string.

SUMMARY

JP 2018-074709 A discloses a power supply system that outputs direct current power using a battery string as described above. However, in JP 2018-074709 A, no study has been made on a power supply system that outputs alternating current power using the battery string. When it is possible that a power supply system that outputs alternating current power using the battery string is built, it can be expected that the range of applications for the battery string is expanded, and the cost of the battery string is reduced.

The present disclosure provides a power supply system that outputs alternating current power using a battery string.

A first aspect of the disclosure relates to a power supply system including an alternating current sweep unit and a first power supply circuit. The alternating current sweep unit is configured to output alternating current power from a first U-phase battery string, a first V-phase battery string, and a first W-phase battery string that are Y-connected. The first power supply circuit is configured to convert an output of a direct current sweep unit including a first battery string into alternating current power using an inverter to output alternating current power. Each of the first U-phase battery string, the first V-phase battery string, the first W-phase battery string, and the first battery string includes a plurality of battery circuit modules connected in series. Each of the battery circuit modules includes a battery, output terminals provided to output a voltage of the battery, a first switch connected to the output terminals and connected in parallel to the battery, and a second switch connected in series to the battery, the battery circuit modules each being configured such that the voltage of the battery is applied to the output terminals when the first switch is in an OFF state and the second switch is in an ON state. An output density of the battery included in the first battery string is higher than an output density of the battery included in the first U-phase battery string, the first V-phase battery string, and the first W-phase battery string.

According to the aspect of the present disclosure, it is possible to control the output voltage of the battery string by controlling the states of the first switch and the second switch of the battery circuit module. The first U-phase battery string, the first V-phase battery string, and the first W-phase battery string of the alternating current sweep unit are Y-connected, and thus it is possible to output alternating current power (for example, three-phase alternating current power) by controlling the output voltage of each battery string. By converting direct current power output from the first battery string into alternating current power using the inverter, it is possible to output alternating current power from the first power supply circuit.

The alternating current sweep unit is relatively inefficient since it outputs alternating current power by controlling the first switch and the second switch of the battery circuit module, and thus it is desirable to suppress the maximum output (maximum power). The first power supply circuit outputs alternating current power using the inverter, and thus is more efficient than the alternating current sweep unit. The battery included in the first battery string has a higher output density than that of the battery included in the first U-phase battery string, the first V-phase battery string, and the first W-phase battery string, and thus it is possible to suitably output alternating current power from the first power supply circuit when high output is requested.

In the aspect of the present disclosure, an energy density of the battery included in the first U-phase battery string, the first V-phase battery string, and the first W-phase battery string may be higher than an energy density of the battery included in the first battery string.

According to the aspect of the present disclosure, it is possible to suitably output alternating current power from the alternating current sweep unit when a relatively low output is requested and a long-term output is requested. This makes it possible to widely change the output characteristics of the power supply system (particularly the output power and output duration). Further, by combining a power type battery having a high output density and an energy type battery having a high energy density, it is possible to make each battery perform its specialty output (high output/long-term output). This makes it possible to provide a power supply system having a higher output and a higher capacity at a lower cost than a power supply system using an energy type battery alone or a power type battery alone.

In the aspect of the present disclosure, the battery included in the first battery string may be a nickel-metal hydride battery, and the battery included in the first U-phase battery string, the first V-phase battery string, and the first W-phase battery string may be a lithium-ion battery.

In the electrified vehicle currently in widespread use, either a nickel-metal hydride battery or a lithium-ion battery is often used as a battery for storing power for traveling. Further, as battery characteristics, a nickel-metal hydride battery is generally a high-output and low-capacity type, and a lithium-ion battery is a low-output and high-capacity type. Therefore, according to the aspect of the present disclosure, the nickel-metal hydride battery and the lithium-ion battery used in the electrified vehicle can be reused to build the power supply system of the present disclosure.

In the aspect of the present disclosure, the power supply system may further include a control device configured to control the alternating current sweep unit and the first power supply circuit, and the control device may be configured to output alternating current power from the first power supply circuit when a request power is larger than a first predetermined value.

According to the aspect of the present disclosure, it is possible to, when high output is requested, suitably output alternating current power from the first power supply circuit including a battery having a high output density.

In the aspect of the present disclosure, the control device may be configured to output alternating current power from the alternating current sweep unit in addition to outputting the alternating current power from the first power supply circuit, when the request power is larger than a second predetermined value which is larger than the first predetermined value ($\alpha$).

In the aspect of the present disclosure, the alternating current sweep unit and the first power supply circuit may be configured to be electrically connected to an external power supply, and the control device may be configured to control the alternating current sweep unit and the first power supply circuit to perform power adjustment on the external power supply by input and output power of the alternating current sweep unit and the first power supply circuit, and control connection and disconnection between the alternating current sweep unit and the external power supply and connection and disconnection between the first power supply circuit and the external power supply depending on a response time and an adjustment time requested in the power adjustment.

According to the aspect of the present disclosure, it is possible to adjust the power of an external power supply by using the power supply system of the present disclosure. The connection and disconnection between the alternating current sweep unit and the external power supply and the connection and disconnection between the first power supply circuit and the external power supply are controlled depending on the response time and the adjustment time requested in the power adjustment, and thus it is possible to deal with a wide range of output power and output duration requested for the power supply system.

In the aspect of the present disclosure, the alternating current sweep unit may be configured such that the first U-phase battery string and a second U-phase battery string that are connected in parallel, the first V-phase battery string and a second V-phase battery string that are connected in parallel, and the first W-phase battery string and a second W-phase battery string that are connected in parallel are Y-connected to output alternating current.

According to the aspect of the present disclosure, it is possible to provide a power supply system that outputs alternating current power by using a battery string.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings. In the drawings, the same or corresponding elements are denoted by the same reference numerals and descriptions thereof will not be repeated.

Figure 1:
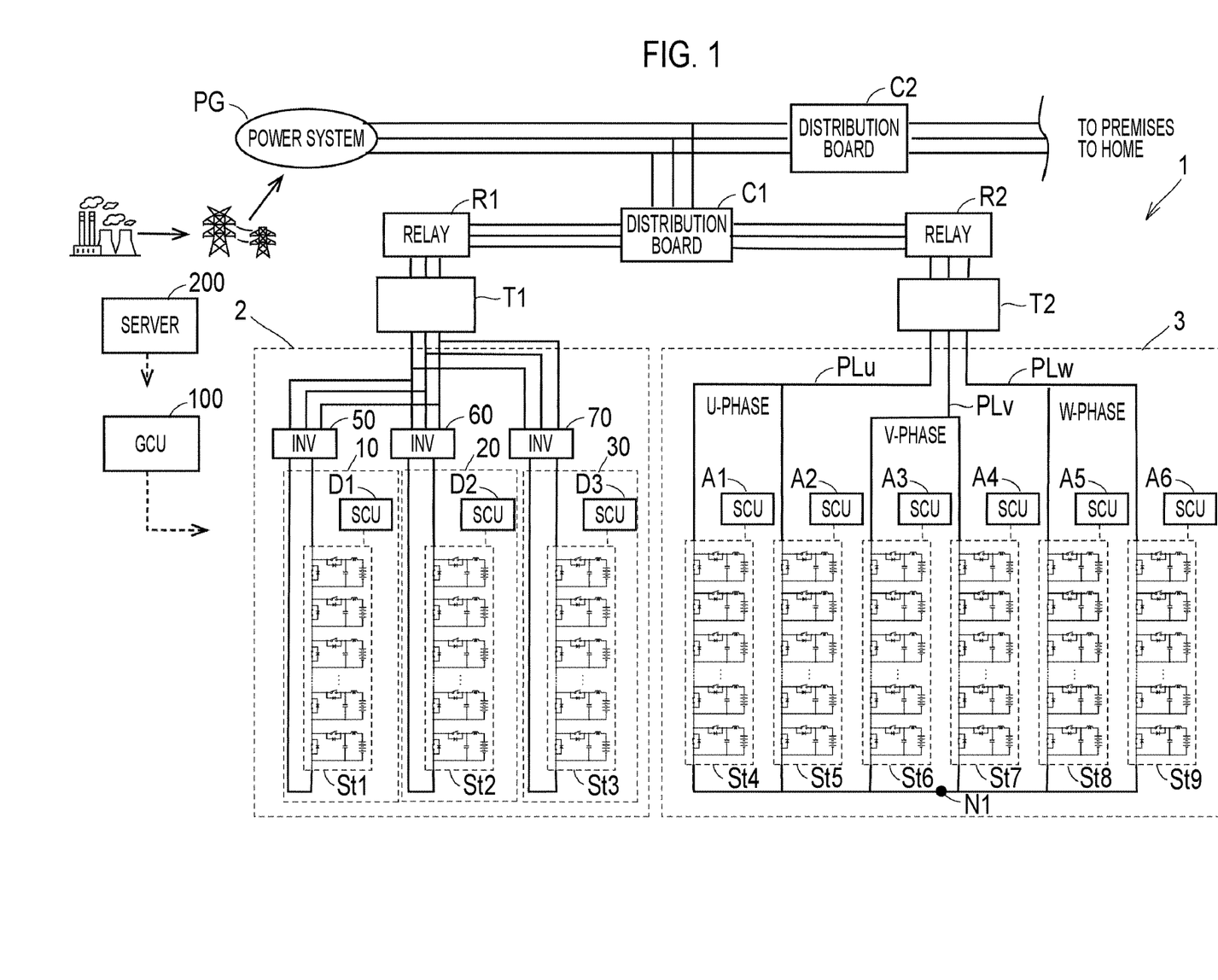
FIG. 1 is a diagram showing a configuration of a power supply system according to a present embodiment.

FIG. 1 is a diagram showing a configuration of a power supply system according to a present embodiment. The power supply system 1 includes a first power supply circuit 2, an alternating current sweep unit 3, and a group control unit (GCU) 100.

The first power supply circuit 2 includes a first direct current sweep unit 10, a second direct current sweep unit 20, a third direct current sweep unit 30, a first inverter 50, a second inverter 60, and a third inverter 70. In the present embodiment, configurations of string control units (SCUs) D1 to D3, A1 to A6, and battery strings St1 to St9 among the first direct current sweep unit 10, the second direct current sweep unit 20, the third direct current sweep unit 30, and the alternating current sweep unit 3 are substantially the same, and thus the configuration will be described with reference to FIG. 2. In the following, when the battery strings St1 to St9 are not distinguished, the battery strings St1 to St9 are referred to as "battery string(s) St", and when the SCU D1 to D3 and A1 to A9 are not distinguished, SCU D1 to D3 and A1 to A9 are simply referred to as "SCU(s)". Further, a configuration including the SCU and a battery string St is referred to as a "sweep unit SU".

Figure 2:
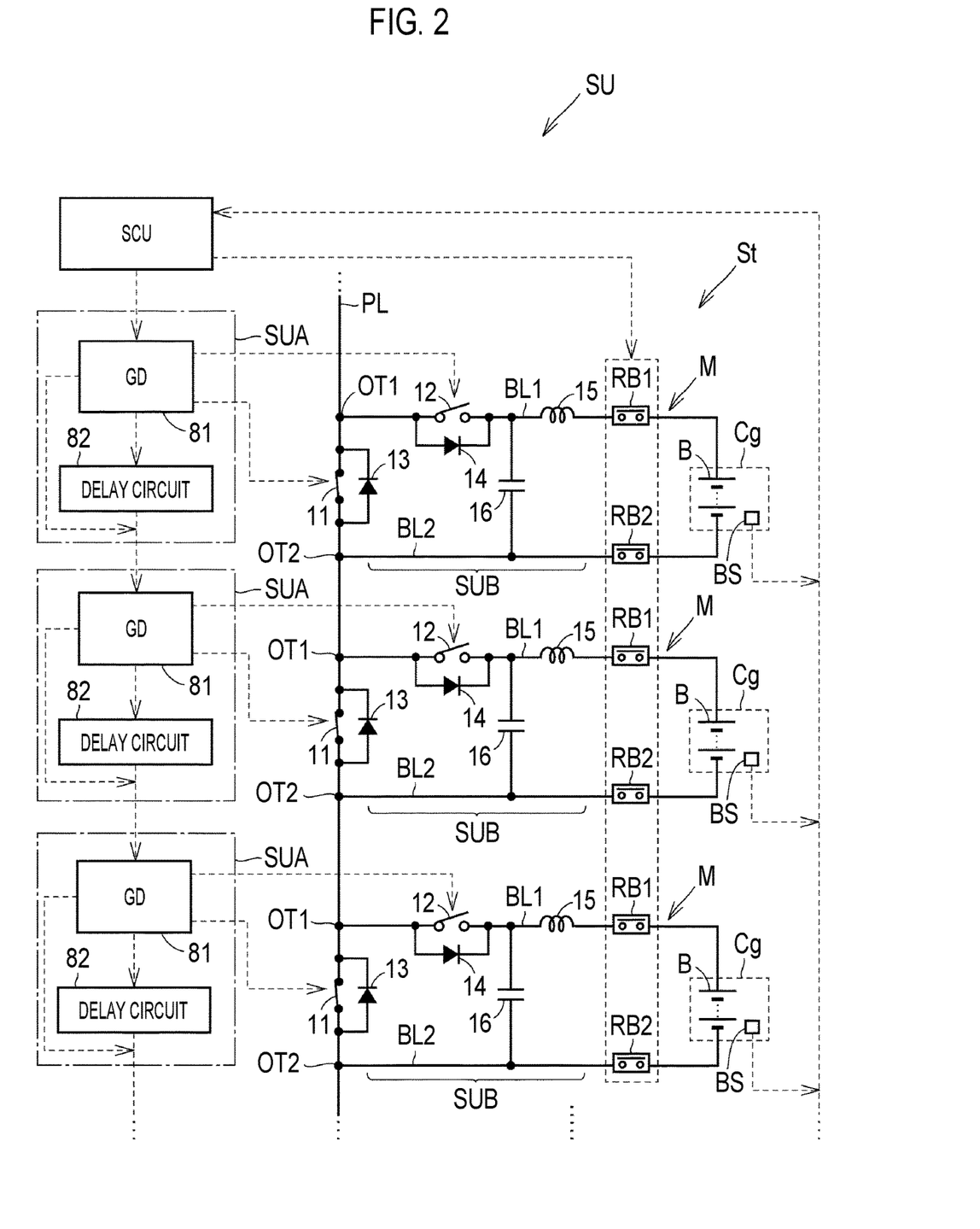
FIG. 2 is a diagram showing a configuration of a sweep unit.

FIG. 2 is a diagram showing the configuration of the sweep unit SU. The sweep unit SU includes an SCU, drive circuits SUA, and a battery string St. The battery string St includes a plurality of battery circuit modules M. In the present embodiment, the number of battery circuit modules M included in the battery string St is 22, but any number may be employed, for example, the number may be 5 to 50, or may be 100 or more. In the present embodiment, each battery string St includes the same number of battery circuit modules M, but the number of battery circuit modules M may be different for each battery string St.

Each of the battery circuit modules M includes a power circuit SUB and a cartridge Cg. The cartridge Cg includes a battery B and a monitoring unit BS. By connecting the power circuit SUB and the battery B, the battery circuit module M including the battery B is formed. The drive circuit SUA is configured to drive switches (more specifically, described later as SW 11 and SW 12) included in the battery circuit module M. The battery B may be a nickel-metal hydride rechargeable battery or a lithium-ion rechargeable battery, and the battery B may be manufactured by connecting rechargeable batteries used in an electrified vehicle in series.

As shown in FIG. 2, the battery circuit module M includes the power circuit SUB, the cartridge Cg, and circuit breakers RB1, RB2 (hereinafter, referred to as "circuit breaker RB" when the circuit breakers RB1, RB2 are not distinguished). The power circuit SUB and the cartridge Cg are connected to each other through the circuit breakers RB1, RB2. The SCU is configured to switch connection states (conduction/disconnection) between the power circuit SUB and the cartridge Cg by controlling ON/OFF of each circuit breaker RB according to a control command from the GCU 100. The circuit breaker RB may be an electromagnetic mechanical relay. The circuit breaker RB may be configured to be manually turned on and off by a user.

In the present embodiment, the cartridge Cg is configured to be detachably attached to the power circuit SUB. For example, when each of the circuit breakers RB1, RB2 is in the OFF state (disconnection state), the user may remove the cartridge Cg from the power circuit SUB. Since the battery string St can operate even without a cartridge, the user can easily increase or decrease the number of cartridges Cg contained in the battery string St. Such a battery string St is suitable for battery reuse.

In the cartridge Cg, the monitoring unit BS is configured to detect the state of the battery B (for example, voltage, current, and temperature) and output the detection result to the SCU. The monitoring unit BS includes a voltage sensor that detects the voltage of the battery B, a current sensor that detects the current of the battery B, and a temperature sensor that detects the temperature of the battery B. Further, the monitoring unit BS may be a battery management system (BMS) having a state-of-charge (SOC) estimation function, a state-of-health (SOH) estimation function, a battery voltage equalization function, a diagnostic function, and a communication function in addition to the above sensor functions. The SCU obtains the state of each battery B (for example, temperature, current, voltage, SOC, and internal resistance) based on the output of each monitoring unit BS, and outputs the obtained state of each battery B to the GCU 100.

The battery circuit module M included in the battery string St is connected by a common electric line PL. The electric line PL includes output terminals OT1, OT2 of each battery circuit module M. By connecting the output terminal OT2 of the battery circuit to the output terminal OT1 of the battery circuit adjacent to the corresponding battery circuit module M, the battery circuit modules M included in the battery string St are connected with each other.

The power circuit SUB includes a first switching element 11 (hereinafter referred to as "SW 11"), a second switching element 12 (hereinafter referred to as "SW 12"), a first diode 13, a second diode 14, and a choke coil 15, a capacitor 16, and the output terminals OT1, OT2. Each of the SW 11 and the SW 12 is driven by the drive circuit SUA. The SW 11 and the SW 12 according to the present embodiment are examples of the "first switch" and the "second switch" according to the present disclosure, respectively.

The SW 11, the capacitor 16, and the battery B are connected in parallel between the output terminals OT1, OT2 of the power circuit SUB. The SW 11 is positioned on the electric line PL and is configured to switch the connection state (conduction/disconnection) between the output terminal OT1 and the output terminal OT2. The output terminal OT1 is connected to the positive electrode of the battery B through an electric line BL1, and the output terminal OT2 is connected to the negative electrode of the battery B through an electric line BL2. The circuit breakers RB1, RB2 are provided on the electric lines BL1, BL2, respectively. The electric line BL1 is further provided with the SW 12 and the choke coil 15. In a battery circuit BC, the voltage of the battery B is applied between the output terminals OT1, OT2 when the SW 12 connected in series with the battery B is in the ON state (connection state) and the SW 11 connected in parallel to the battery B is in the OFF state (disconnection state).

The capacitor 16 connected to the electric lines BL1, BL2 is provided between the output terminals OT1, OT2 and the battery B. One end of the capacitor 16 is connected to the electric line BL1 between the SW 12 and the choke coil 15. The capacitor 16 smooths the voltage of the battery B and outputs the smoothed voltage between the output terminals OT1, OT2.

Each of the SW 11 and the SW 12 is, for example, a field effect transistor (FET). The first diode 13 and the second diode 14 are connected in parallel to the SW 11 and the SW 12, respectively. The SW 12 is positioned between the output terminal OT1 and the choke coil 15. The choke coil 15 is positioned between the SW 12 and the positive electrode of the battery B. An RCL filter is formed by the battery B, the choke coil 15, and the capacitor 16. Current leveling is achieved by the RCL filter. Each of the SW 11 and the SW 12 is not limited to the FET, and may be a switch other than the FET.

The SCU generates a gate signal according to a control command from the GCU 100. The drive circuit SUA is provided for each battery circuit module M, and includes a gate driver (GD) 81 that drives the SW 11 and the SW 12 according to the gate signal, and a delay circuit 82 that delays the gate signal. ON/OFF of each of SW 11 and SW 12 included in the battery circuit module M is controlled according to the gate signal.

Figure 3:
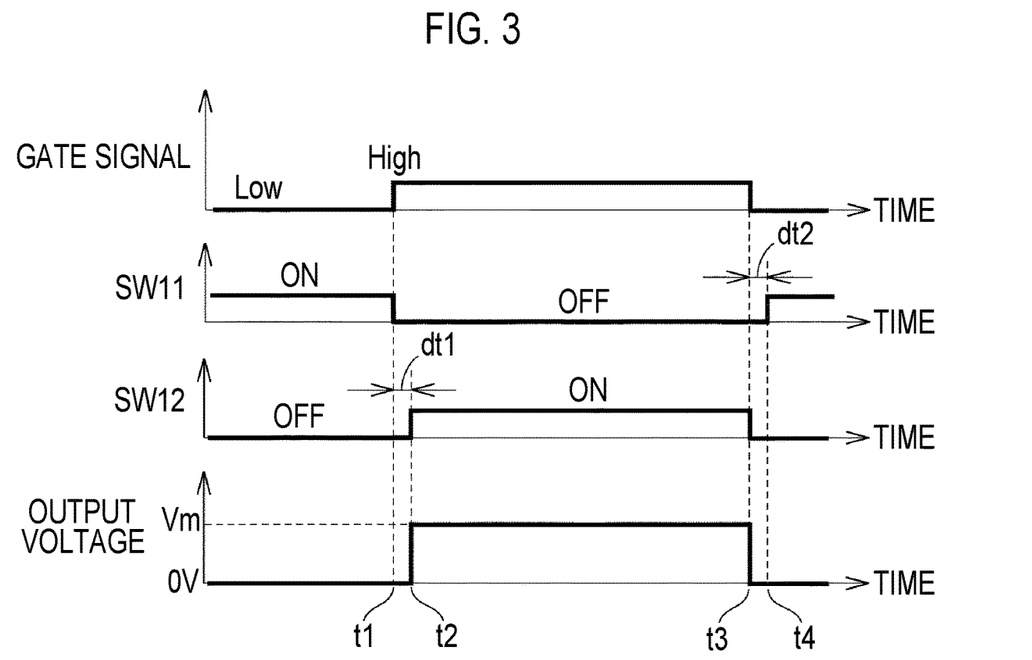
FIG. 3 is a time chart showing an example of an operation of a battery circuit module controlled by a gate signal.

FIG. 3 is a time chart showing an example of the operation of the battery circuit module M controlled by a gate signal. In the present embodiment, a rectangular wave signal is employed as the gate signal for driving the SW 11 and the SW 12. "Low" and "High" of the gate signal shown in FIG. 3 mean an L level and an H level of the gate signal (rectangular wave signal), respectively. Further, an "output voltage" means a voltage output between the output terminals OT1, OT2.

In an initial state of the battery circuit module M, no gate signal is input to the drive circuit SUA (gate signal=L level), and the SW 11 and the SW 12 are in the ON state and the OFF state, respectively.

When a gate signal is input to the drive circuit SUA, the GD 81 drives the SW 11 and the SW 12 according to the input gate signal. In the example shown in FIG. 3, at a timing t1, the gate signal rises from the L level to the H level, and the SW 11 is switched from the ON state to the OFF state at the same time as the rise of the gate signal. Then, the SW 12 is switched from the OFF state to the ON state at a timing t2, which is delayed by a predetermined time (hereinafter, referred to as "dt1") from the rise of the gate signal. In this way, the battery circuit module M is put into a driven state. Hereinafter, the period until the elapse of dt1 from the rise of the gate signal is also referred to as a "first delay period".

Figure 4:
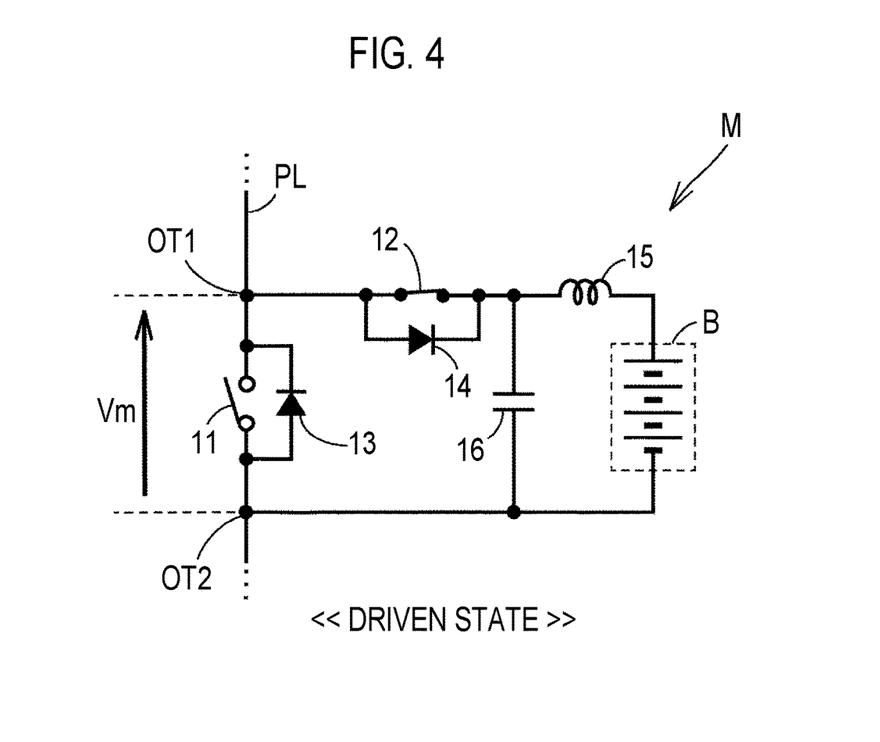
FIG. 4 is a diagram showing the battery circuit module in an operating state.

FIG. 4 is a diagram showing the battery circuit module M in a driven state. In the battery circuit BC in the driven state, the voltage of the battery B is applied between the output terminals OT1, OT2 when the SW 11 is turned off and the SW 12 is turned on. When the voltage of the battery B is applied between the output terminals OT1, OT2 through the capacitor 16, a voltage Vm is output between the output terminals OT1, OT2.

Referring to FIG. 3, when the gate signal falls from the H level to the L level at a timing t3, the SW 12 is switched from the ON state to the OFF state at the same time as the fall of the gate signal. In this way, the battery circuit module M is put into a stopped state. In the battery circuit module M in the stopped state, the voltage of the battery B is not applied between the output terminals OT1, OT2 when the SW 12 is turned off. Then, the SW 11 is switched from the OFF state to the ON state at a timing t4, which is delayed by a predetermined time (hereinafter, referred to as "dt2") from the fall of the gate signal. dt1 and dt2 may be the same as or different from each other. In the present embodiment, each of dt1 and dt2 is set to 100 nsec. Note that each of dt1 and dt2 can be set to any value.

Hereinafter, the period until the elapse of dt2 from the fall of the gate signal is also referred to as a "second delay period". Further, the period from when the second delay period ends until the battery circuit module M is put into an operating state is also referred to as a "stop period".

Figure 5:
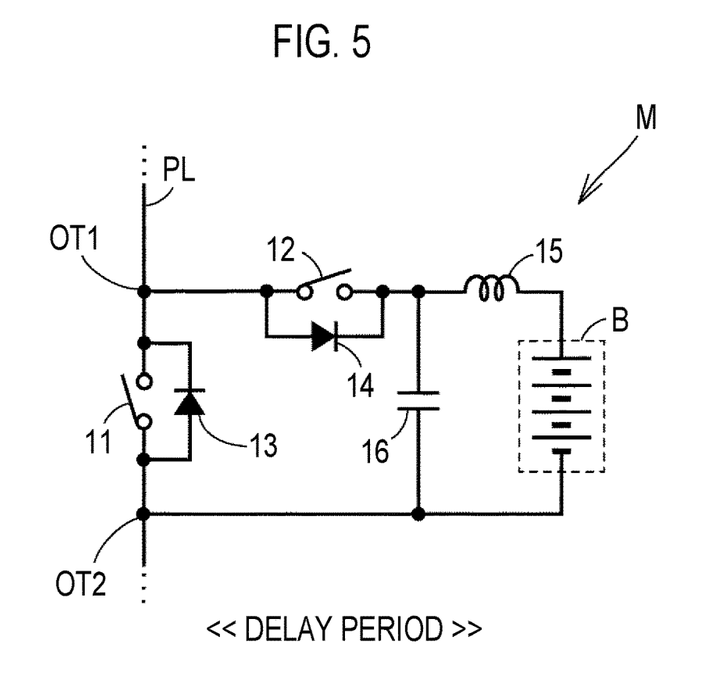
FIG. 5 is a diagram showing a state of the battery circuit module during a delay period.

FIG. 5 is a diagram showing a state of the battery circuit module M during a delay period. As shown in FIG. 5, both the SW 11 and the SW 12 are turned off in each of the first delay period and the second delay period.

Figure 6:
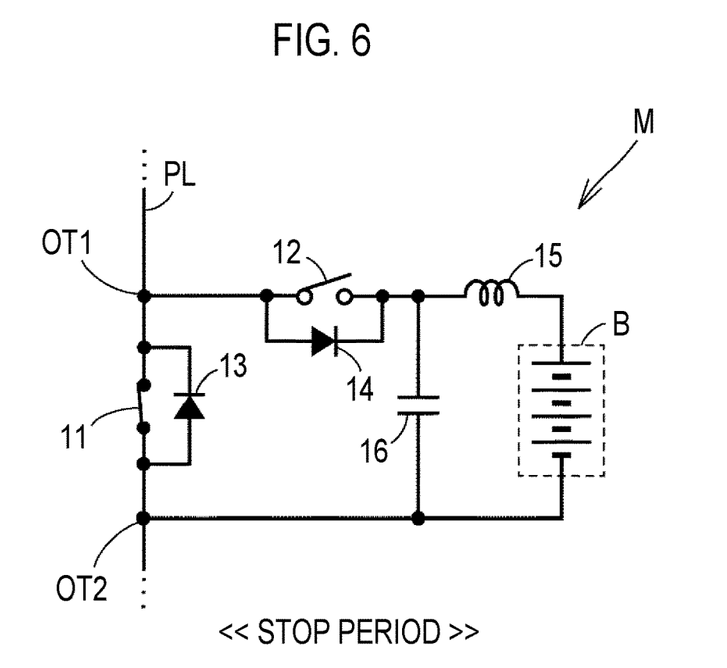
FIG. 6 is a diagram showing a state of the battery circuit module during a stop period.

FIG. 6 is a diagram showing a state of the battery circuit module M during a stop period. As shown in FIG. 6, during the stop period, the SW 11 is turned on and the SW 12 is turned off, as in the initial state.

The battery circuit module M is in the stopped state in both the delay period and the stop period. In the battery circuit module M in the stopped state, no voltage is applied between the output terminals OT1, OT2. By setting the first delay period and the second delay period the simultaneous turn-on of the SW 11 and the SW 12 (that is, the battery circuit module M being short-circuited) is suppressed.

By controlling the battery circuit modules M included in the battery string St as described above, it is possible to adjust the number of the battery circuit modules M in the driven state, which makes it possible to control the output voltage of the battery string St. In this way, the sweep unit SU is configured to output a voltage from 0 V to the sum of the voltages of respective batteries B included in the battery string St.

Figure 7:
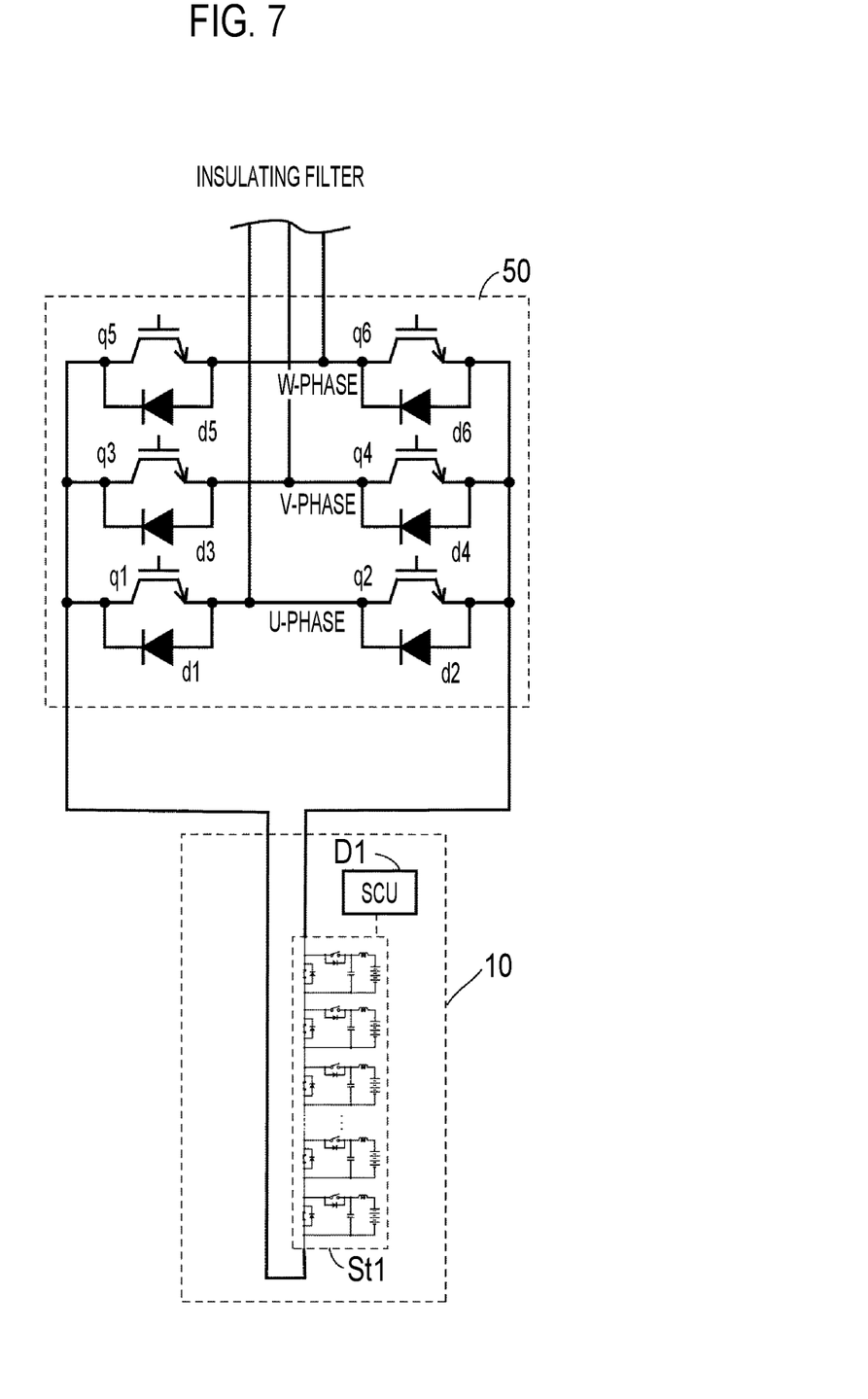
FIG. 7 is a diagram showing a configuration of a first inverter.

Referring to FIG. 1, the first direct current sweep unit 10 is a sweep unit SU configured as described above, and includes the battery string St1 and the SCU D1. The battery B of the battery circuit module M included in the battery string St1 is a nickel-metal hydride rechargeable battery. The direct current power output from the first direct current sweep unit 10 is input to the first inverter 50. FIG. 7 is a diagram showing a configuration of the first inverter 50. The first inverter 50 is a three-phase inverter, and includes switching elements q1, q2 connected in series in a U-phase arm, the switching elements q3, q4 connected in series in a V-phase arm, and switching elements q5, q6 connected in series in a W-phase arm. Diodes d1 to d6 are connected in antiparallel between collectors and the emitters of the switching elements q1 to q6.

An intermediate point of each phase arm of the first inverter 50 is connected to an insulating filter T1 and further connected to a power system PG through a relay R1 and a distribution board C1 (see FIG. 1). Each of the switching elements q1 to q6 of the first inverter 50 is turned on/off by a control command from the GCU 100, for example, by pulse width modulation (PWM) control. The first inverter 50 converts the direct current power output from the first direct current sweep unit 10 into alternating current power (three-phase alternating current power) and supplies the alternating current power to the power system PG Further, the first inverter 50 converts the alternating current power (three-phase alternating current power) supplied from the power system PG into direct current power and supplies the direct current power to the first direct current sweep unit 10 to charge the battery B of the battery string St1. In the present embodiment, the three-phase inverter used to drive the three-phase synchronous motor of the electrified vehicle is reused for the first inverter 50.

In FIG. 1, the second direct current sweep unit 20 including the battery string St2 and SCU D2 and the third direct current sweep unit 30 including the battery string St3 and SCU D3 have the same configuration as the first direct current sweep unit 10. The second inverter 60 connected to the second direct current sweep unit 20 and the third inverter 70 connected to the third direct current sweep unit 30 have the same configuration as the first inverter 50. The intermediate points of respective phase arms of the first inverter 50, the second inverter 60, and the third inverter 70 are connected by power lines, and the first direct current sweep unit 10, the second direct current sweep unit 20, and the third direct current sweep unit 30 are (electrically) connected in parallel to the insulating filter T1. In this way, the first power supply circuit 2 outputs alternating current power (three-phase alternating current power) from the first direct current sweep unit 10, the second direct current sweep unit 20, and the third direct current sweep unit 30 (using first to third inverters 50 to 70), which are connected in parallel to each other.

Figure 8:
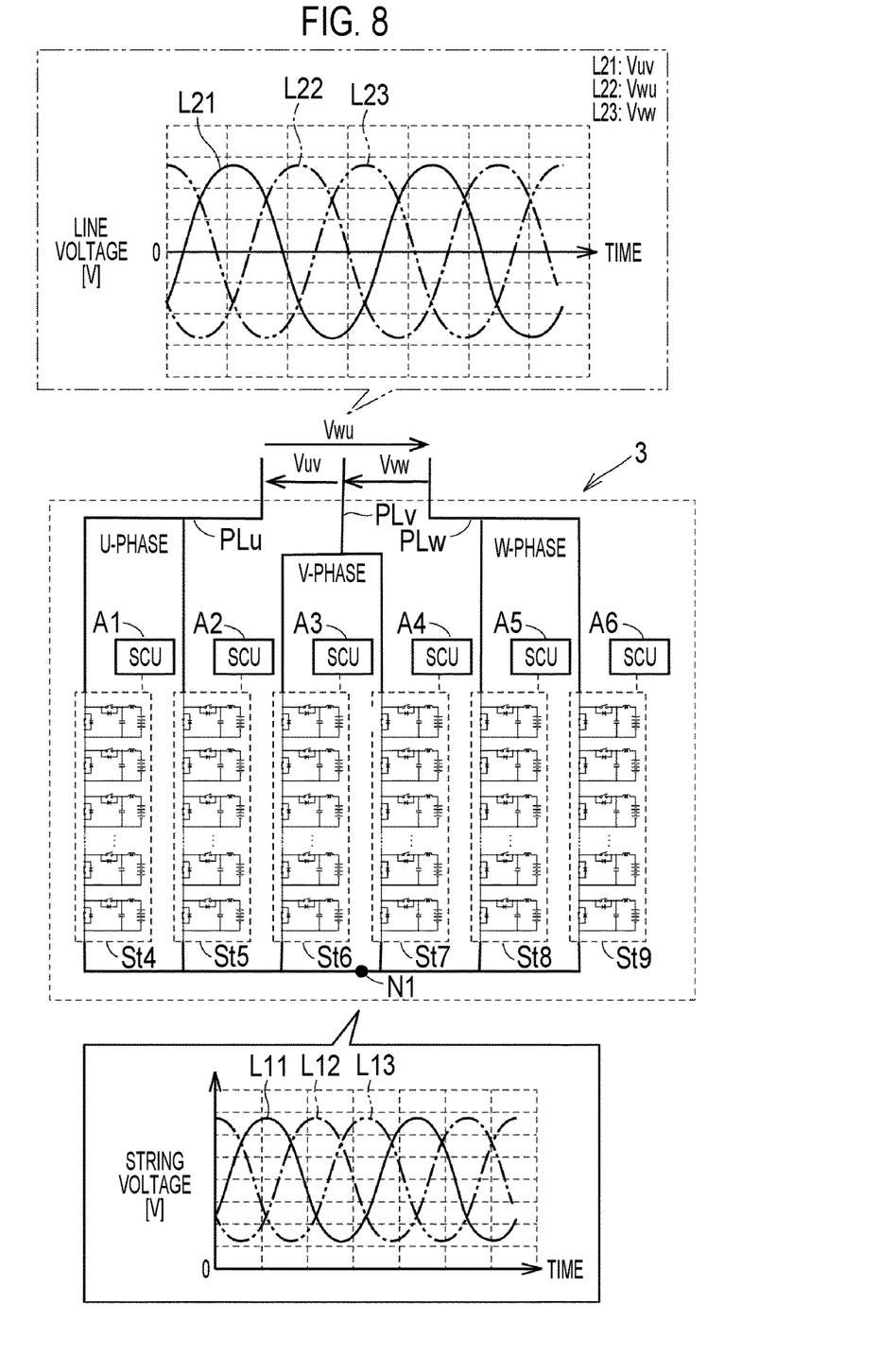
FIG. 8 is a diagram showing a configuration of an alternating current sweep unit.

FIG. 8 is a diagram showing a configuration of the alternating current sweep unit 3. A configuration of a first U-phase battery string St4 and an SCU A1 is substantially the same as that of the sweep unit SU described with reference to FIG. 2. The same applies to "a second U-phase battery string St5 and an SCU A2", "a first V-phase battery string St6 and an SCU A3", "a second V-phase battery strings St7 and an SCU A4", "a first W-phase battery string St8 and an SCU A5", and "a second W-phase battery string St9 and an SCU A6".

In the present embodiment, the batteries B of the battery circuit modules M included in the first U-phase battery string St4, the first V-phase battery string St6, and the first W-phase battery string St8 are ternary system (NMC) lithium-ion rechargeable batteries. Further, the batteries B of the battery circuit modules M included in the second U-phase battery string St5, the second V-phase battery string St7, and the second W-phase battery string St9 are iron phosphate-based (LFP) lithium-ion rechargeable batteries.

In FIG. 8, a positive electrode terminal of the first U-phase battery string St4 and a positive electrode terminal of the second U-phase battery string St5 are connected to a power line PLu. A positive electrode terminal of the first V-phase battery string St6 and a positive electrode terminal of the second V-phase battery string St7 are connected to a power line PLv. A positive electrode terminal of the first W-phase battery string St8 and a positive electrode terminal of the second W-phase battery string St9 are connected to a power line PLw. Further, negative electrode terminals of the battery strings St4 to St9 are connected to a neutral point N1. In this way, the alternating current sweep unit 3 has a configuration in which "the first U-phase battery string St4 and the second U-phase battery string St5 that are connected in parallel", "the first V-phase battery string St6 and the second V-phase battery string St7 that are connected in parallel", and "the first W-phase battery string St8 and the second W-phase battery string St9 that are connected in parallel" are Y-connected.

The SCUs A1 to A6 controls string voltages (output voltages) of respective battery strings St4 to St9 to have a voltage waveform shown at the lower portion of FIG. 8 by the control command from the GCU 100. In FIG. 8, a line L11 is a string voltage of the first U-phase battery string St4 and the second U-phase battery string St5. A line L12 is a string voltage of the first V-phase battery string St6 and the second V-phase battery string St7. A line L13 is a string voltage of the first W-phase battery string St8 and the second W-phase battery string St9. The lines L11, L12, L13 are sine waves that are 120° out of phase and have a frequency of 60 Hz.

As described above, by controlling the string voltage of each of the battery strings St4 to St9, line voltages of the power lines PLu, PLv, PLw have voltage waveforms shown in the upper portion of FIG. 8. In FIG. 8, a line L21 indicates a line voltage "Vuv" between the power line PLu and the power line PLv, a line L22 indicates a line voltage "Vwu" between the power line PLw and the power line PLu, and a line L23 indicates a line voltage "Vvw" between the power line PLv and the power line PLw. Each line voltage has a sinusoidal alternating current waveform with periodical changing polarity (positive/negative). In this way, alternating current power (three-phase alternating current power) is output from the alternating current sweep unit 3.

Referring to FIG. 1, the alternating current power output from the first power supply circuit 2 is supplied to the power system PG through the insulating filter T1, the relay R1, and the distribution board C1. The alternating current power output from the alternating current sweep unit 3 is supplied to the power system PG through the insulating filter T2, a relay R2, and the distribution board C1.

The insulating filter T1 and the insulating filter T2 include, for example, an LCL filter and a three-phase transformer. The insulating filter T1 and the insulating filter T2 reduce the noise component of the three-phase alternating current component by the LCL filter, convert the three-phase alternating current power to a predetermined voltage (for example, 200V) by the three-phase transformer, and insulate the input side and the output side.

The relay R1 and the relay R2 may be an electromagnetic mechanical relay, and by controlling the ON/OFF of the relay R1 by the GCU 100, connection (parallel) and disconnection (off) between the first power supply circuit 2 and the power system PG is made. Further, by controlling the ON/OFF of the relay R2 by the GCU 100, connection and disconnection between the alternating current sweep unit 3 and the power system PG is made.

The distribution board C1 is provided with either an earth-leakage circuit breaker, a breaker or both, and when the batteries B of the battery string St included in the first power supply circuit 2 and the alternating current sweep unit 3 are charged, the power of the power system PG is distributed to the first power supply circuit 2 and the alternating current sweep unit 3. Further, the distribution board C1 supplies the power output from the first power supply circuit 2 and the alternating current sweep unit 3 to the power system PG.

When the batteries B of the battery strings St included in the first power supply circuit 2 are charged, the batteries B are charged by converting the alternating current power supplied from the power system PG into direct current power by the first to third inverters 50 to 70. When the batteries B of the battery strings St included in the alternating current sweep unit 3 are charged, the batteries B are charged by the SCUs A1 to A6 controlling the SWs 11 and the SWs 12 such that the voltage of the battery string St is slightly lower than the alternating current voltage supplied from the power system PG.

The alternating current power of the first power supply circuit 2 and the alternating current power of the alternating current sweep unit 3, which are supplied to the power system PG are supplied to the line in the premises or the home through the distribution board C2 together with the alternating current power of the power system PG.

The server 200 manages the supply and demand of the power system PG (power grid) provided by a power company (power generation company and power transmission and distribution company). The server 200 is configured to be communicable with the GCU 100, and requests the GCU 100 to adjust the power of the power system PG as requested. Upon receiving the request from the server 200, the GCU 100 controls the SUCs of the sweep unit SU, the first to third inverters 50 to 70, the relay R1, and the relay R2 to adjust input and output power of the first power supply circuit 2 and the alternating current sweep unit 3.

Figure 9:
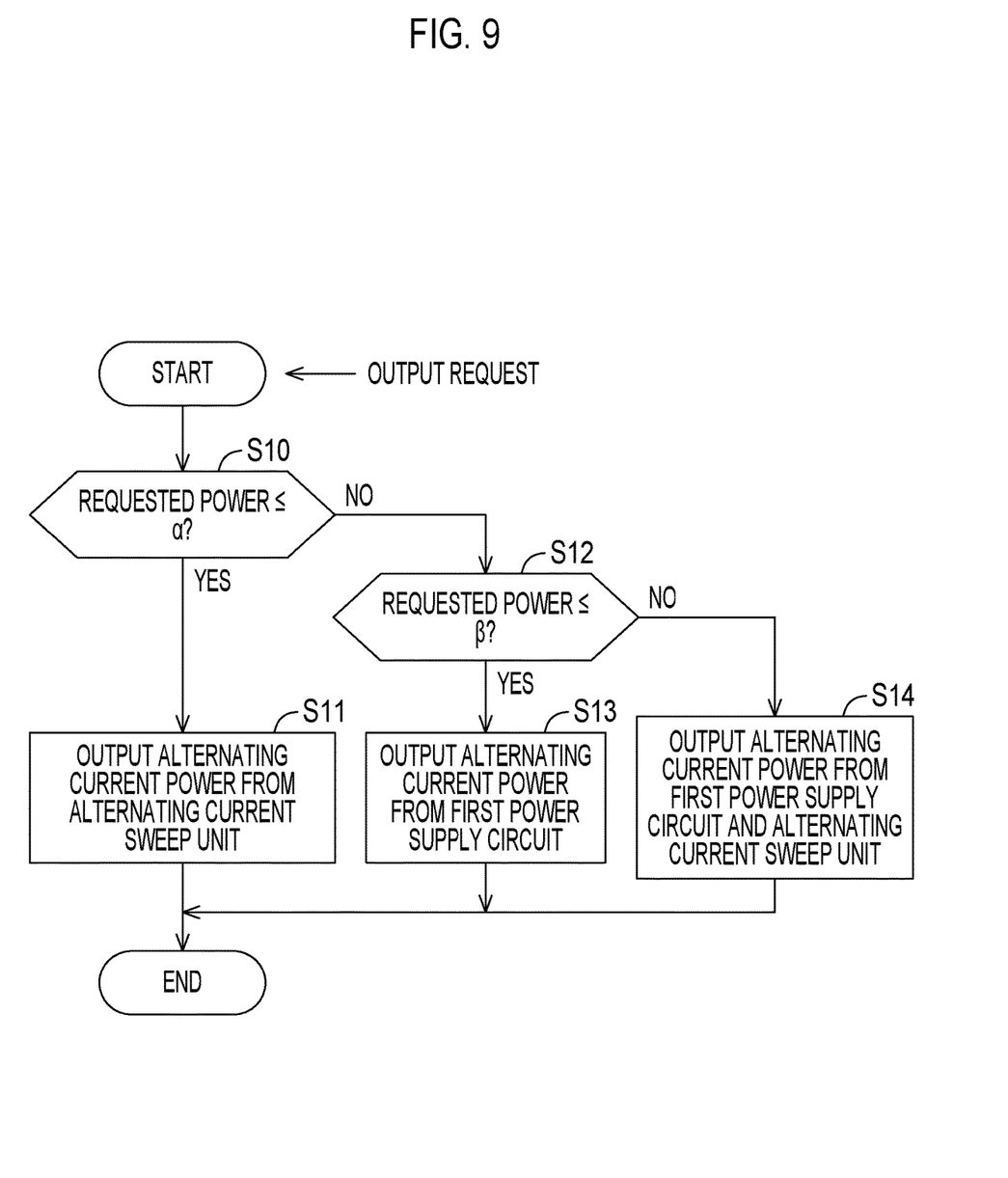
FIG. 9 is a flowchart showing an example of a process executed by a GCU when output of power is requested from a server.

FIG. 9 is a flowchart showing an example of a process executed by the GCU 100 when output of power is requested from the server 200. The flowchart is executed when the GCU 100 receives an output request from the server 200. When the output request is received from the server 200, a determination is made in step 10 (hereinafter, the step is abbreviated as "S") whether or not a request power is α or less. α is a value preset according to the specifications such as the number of battery strings St possessed by the power supply system 1, and may be, for example, 10 kW. When the request output is α or less, the determination made in S10 is affirmative and the process proceeds to S11.

In S11, the GCU 100 outputs alternating current power from the alternating current sweep unit 3 and supplies the output alternating current power to the power system PG Further, the GCU 100 turns on the relay R2, connects (parallel) the alternating current sweep unit 3 with the power system PG and controls SWs 11 and SWs 12 of the battery strings St4 to St9 by the SCUs A1 to A6 to output alternating current power (three-phase alternating current power) from the alternating current sweep unit 3.

When the request power is larger than α, the determination made in S10 is negative and the process proceeds to S12. In S12, the GCU 100 determines whether or not the request power is β or less. β is a value preset according to the specifications such as the number of battery strings St possessed by the power supply system 1, and may be, for example, 25 kW. When the request power is β or less, the determination made in S12 is affirmative and the process proceeds to S13.

In S13, the GCU 100 outputs alternating current power from the first power supply circuit 2 and supplies the output alternating current power to the power system PG The GCU 100 turns the relay R1 on and connects (parallel) the first power supply circuit 2 with the power system PG The GCU 100 controls the SWs 11 and the SWs 12 of the battery strings St1 to St3 by SCUs D1 to D3, thereby outputting direct current power from the first direct current sweep unit 10, the second direct current sweep unit 20, and the third direct current sweep unit 30. The GCU 100 converts the direct current power into alternating current power using the first to third inverters 50 to 70, and supplies the alternating current power (three-phase alternating current power) to the power system PG In this way, when the request power is larger than α, and less than or equal to β, alternating current power is supplied from the first power supply circuit 2 to the power system PG.

When the request power is larger than β, the determination made in S12 is made and the process proceeds to S14. In S14, the GCU 100 outputs alternating current power from the first power supply circuit 2 and the alternating current sweep unit 3 and supplies the alternating current power to the power system PG.

The batteries B of the battery strings St of the first direct current sweep unit 10, the second direct current sweep unit 20, and the third direct current sweep unit 30 included in the first power supply circuit 2 are nickel-metal hydride rechargeable batteries. The batteries B of the battery strings St of the alternating current sweep unit 3 are lithium-ion rechargeable batteries. Due to the battery characteristics, the output density (W/kg) of the nickel-metal hydride rechargeable battery is larger than the output density of the lithium-ion rechargeable battery. Further, the energy density (Wh/kg) of the lithium-ion rechargeable battery is higher than the energy density of the nickel-metal hydride rechargeable battery. For this reason, the nickel-metal hydride rechargeable battery is located in the upper left region of the Ragone plot and can be said to be a power type (output type) battery. Further, the lithium-ion rechargeable battery is located in the lower right region of the Ragone plot and can be said to be an energy type (capacity type) battery.

In the alternating current sweep unit 3, the SWs 11 and the SWs 12 of the battery strings St are controlled at several tens of kHz to output alternating current power, which makes the efficiency low (low efficiency), and thus it is desirable to suppress the maximum output (maximum power). For this reason, in order to increase the output (power (W)) of the alternating current sweep unit 3, it is needed to increase the number of battery strings St in parallel, which leads to an increase in cost. For this reason, it is preferable that the batteries B of the battery strings St of the alternating current sweep unit 3 are charged and discharged at a low rate for use. Therefore, it is desirable that the batteries B of the battery strings St of the alternating current sweep unit 3 are energy type batteries having a large energy density, and in the present embodiment, lithium-ion rechargeable batteries are used.

On the other hand, in the first power supply circuit 2, alternating current power is output by using inverters, which leads to a relatively high efficiency, and thus it is possible to increase the maximum output. Therefore, a large output (power (W)) can be output from the first power supply circuit 2 by using the power type batteries having a large output density as the batteries B of the battery strings St of the first power supply circuit 2 (batteries B of the battery strings St of the first direct current sweep unit 10, the second direct current sweep unit 20, and the third direct current sweep unit 30), and as a result, nickel-metal hydride rechargeable batteries are used in the present embodiment.

According to the example of FIG. 9, when the request power is larger than α and the power output from the power supply system 1 is large, alternating current power can be output from the first power supply circuit 2 (S13). Further, when the request power is α or less, alternating current power is output from the alternating current sweep unit 3 (S11). In this case, the alternating current sweep unit 3 has a higher energy density (the energy density of the batteries B of the battery string St of the alternating current sweep unit 3) and a larger capacity, and thus can output alternating current power over a longer time. By outputting alternating current power from both the first power supply circuit 2 and the alternating current sweep unit 3 (S14) when request power is larger than β, it is possible to output the alternating current power satisfying the request power.

Figure 10:
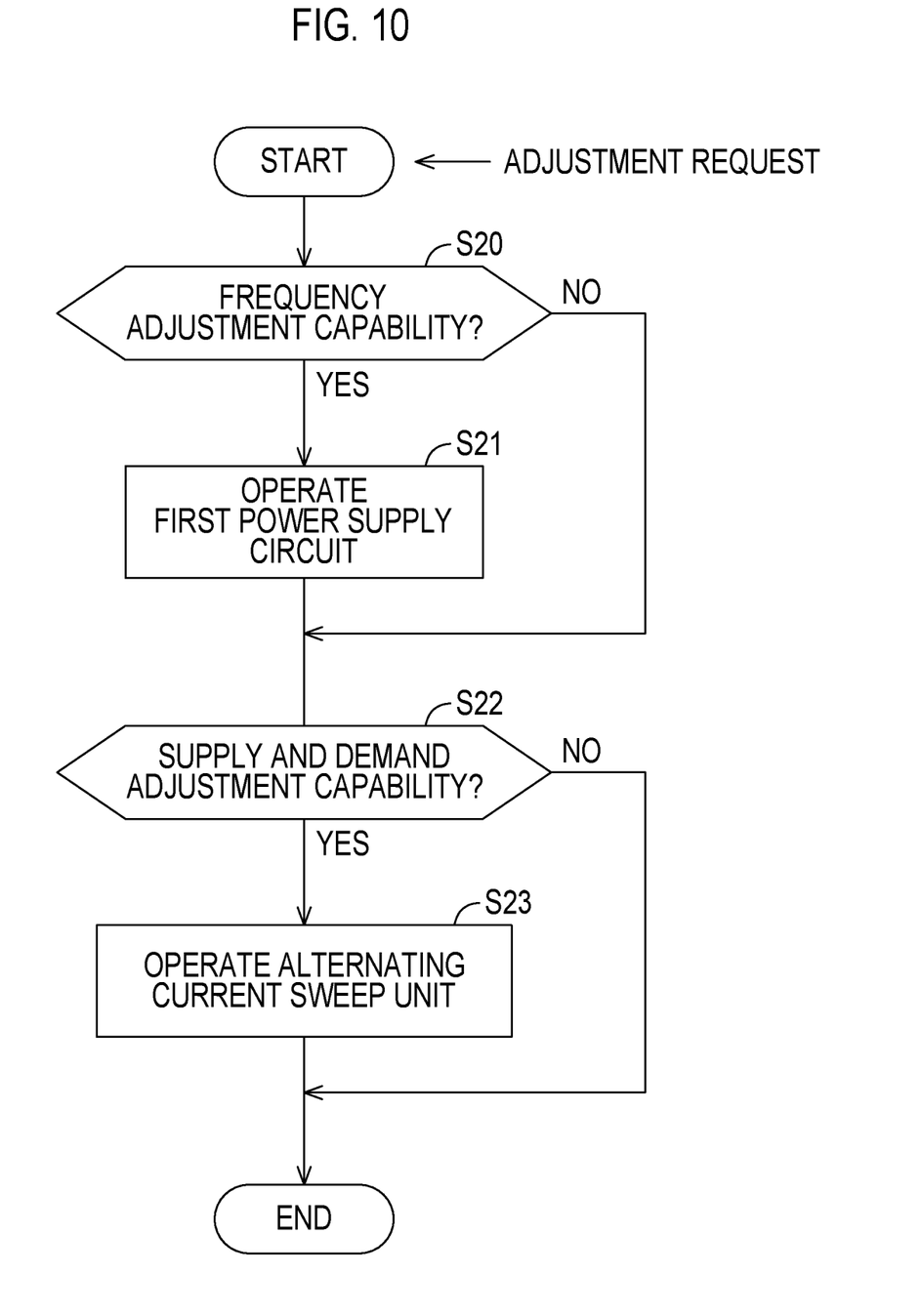
FIG. 10 is a flowchart showing an example of a process executed by a GCU when a power adjustment request is made from a server.

FIG. 10 is a flowchart showing an example of a process executed by the GCU 100 when a power adjustment request is made from the server 200. The flowchart is executed when the GCU 100 receives an adjustment request from the server 200. An adjustment capability requested from the server 200 is an electric power amount with which an output, such as a generator output, for suppressing frequency fluctuation and supply-demand imbalance is adjustable, and is roughly classified into a frequency adjustment capability and a supply and demand adjustment capability. The frequency adjustment capability is governor-free or load frequency control (LFC) for adjusting an output to the frequency fluctuation from seconds to minutes, and the supply and demand adjustment capability is economic load dispatching control (EDC) for reducing the imbalance between supply and demand of electricity over a long period of minutes or longer. As for the frequency adjustment capability, the output change (response time) up to the command value is fast, and the output duration is relatively short. As for the supply and demand adjustment capability, the response time is slow and the output duration is relatively long.

Referring to FIG. 10, in S20, the GCU 100 determines whether or not the adjustment request is a frequency adjustment capability. When the adjustment request is the frequency adjustment capability and an affirmative determination is made, the process proceeds to S21. When the frequency adjustment capability is not requested, an negative determination is made and the process proceeds to S22.

In S21, the GCU 100 operates the first power supply circuit 2. That is, the GCU 100 connects the first power supply circuit 2 and the power system PG (in parallel) with the relay R1 turned on. When the adjustment request is a suppressed demand response (DR), the GCU 100 controls the SWs 11 and the SWs 12 of the battery strings St1 to St3 by the SCUs D1 to D3, thereby outputting direct current power from the first direct current sweep unit 10, the second direct current sweep unit 20, and the third direct current sweep unit 30. The GCU 100 converts the direct current power into alternating current power using the first to third inverters 50 to 70, and supplies the alternating current power (three-phase alternating current power) to the power system PG When the adjustment request is an increased DR, the GCU 100 converts the alternating current power of the power system PG into direct current power by using the first to third inverters 50 to 70. The GCU 100 controls the SWs 11 and the SWs 12 of the battery strings St1 to St3 by SCUs D1 to D3, thereby appropriately charging the batteries B included in the first direct current sweep unit 10, the second direct current sweep unit 20, and the third direct current sweep unit 30. After S21, the process proceeds to S22.

In S22, the GCU 100 determines whether or not the adjustment request is a supply and demand adjustment capability. When the adjustment request is the supply and demand adjustment capability and an affirmative determination is made, the process proceeds to S23. When the frequency adjustment capability is not requested, negative determination is made and the current routine ends.

In S23, the GCU 100 operates the alternating current sweep unit 3. That is, the GCU 100 connects the alternating current sweep unit 3 and the power system PG (in parallel) with the relay R2 turned on. When the adjustment request is a suppressed demand response (DR), the GCU 100 controls the SWs 11 and the SWs 12 of the battery strings St4 to St9 by the SCUs A1 to A6, thereby outputting alternating current power (three-phase alternating current power) from the alternating current sweep unit 3. When the adjustment request is an increased DR, the GCU 100 controls the SWs 11 and the SWs 12 by SCUs A1 to A6 such that the voltage of the battery strings St is slightly lower than the alternating current voltage supplied from the power system PG to appropriately charge the batteries B of the battery strings St included in the alternating current sweep unit 3.

The adjustment capability treated in the supply and demand adjustment market is divided into a primary adjustment capability, a secondary adjustment capability (1), a secondary adjustment capability (2), a tertiary adjustment capability (1), and a tertiary adjustment capability (2) in the order of the fast output change (response time) up to the command value and the shortest output duration. The governor-free, which is an example of the primary adjustment capability, increases or decreases the output in response to a change in the system frequency, and the LFC, which is an example of the secondary adjustment capability (1), adjusts the frequency fluctuation caused by the load fluctuation. The EDC, which is an example of the secondary adjustment capability (2) and the tertiary adjustment capability (1), distributes output to the generator to be the most economical. The tertiary adjustment capability (2) is positioned as the adjustment capability of the low speed frame. For this reason, when the requested adjustment capability is the primary adjustment capability and the secondary adjustment capability (1), the adjustment request may be treated as the frequency adjustment capability, and when the requested adjustment capability is the other adjustment capability, the adjustment request may be treated as the supply and demand adjustment capability.

According to the example of FIG. 10, for the frequency adjustment capability that requests a fast response time and high responsiveness, the adjustment request is met by operating the first power supply circuit 2. The batteries B of the battery strings St of the first power supply circuit 2 (battery strings St of the first to third direct current sweep units 10 to 30) are (power type) nickel-metal hydride rechargeable batteries having a high output density, which makes it possible to suitably suppress frequency fluctuations. The supply and demand adjustment capability requests a power supply system with a long adjustment time and a relatively large capacity. For a demand adjustment capability that requests a long adjustment time and a large capacity, the adjustment request is met by operating the alternating current sweep unit 3. Since the batteries B of the battery strings St of the alternating current sweep unit 3 are lithium-ion rechargeable battery having a high energy density (capacity type), it is possible to suitably meet the demand adjustment. As described above, according to the example of FIG. 10, the connection and disconnection of the power system PG and the alternating current sweep unit 3, and the connection and disconnection of the power system PG and the first power supply circuit 2 are controlled depending on the response time and the adjustment time requested in the power adjustment.

According to the present embodiment, as the batteries of the battery strings St of the first power supply circuit 2 that converts the output of the first to third direct current sweep units 10 to 30 into alternating current power using the first to third inverters 50 to 70 and outputs the converted alternating current power, nickel-metal hydride rechargeable batteries having a high output density are used. Further, as the batteries B of the alternating current sweep unit 3 that outputs alternating current power from the first and second U-phase battery strings St4, St5, and the first and second V-phase battery strings St6, St7, and the first and second W-phase battery strings St8, St9, which are Y-connected, lithium-ion rechargeable batteries having a high energy density are used. Therefore, by combining the power type battery (nickel-metal hydride rechargeable battery) and the energy type battery (lithium-ion rechargeable battery) in the power supply system 1 of the present embodiment, it is possible to make each battery perform its specialty output (high output/long-term output). This makes it possible to provide the power supply system 1 having a higher output and a higher capacity at a lower cost than the power supply system using the energy type battery alone or the power type battery alone.

In the present embodiment, the alternating current sweep unit 3 outputs alternating current (three-phase alternating current) by Y-connecting the battery strings St. Since no inverter is used, the cost can be reduced.

In the present embodiment, in the first power supply circuit 2, the first direct current sweep unit 10, the second direct current sweep unit 20, and the third direct current sweep unit 30 are connected in parallel. The first to third direct current sweep units 10 to 30 are examples of the "direct current sweep unit" of the present disclosure, and the battery strings St1 to St3 are examples of the "first battery string" of the present disclosure. In the present embodiment, three direct current sweep units are connected in parallel, but the number of direct current sweep units may be one or four or more.

In the present embodiment, in the alternating current sweep unit 3, the first and second U-phase battery strings St4, St5 are used as the U-phase battery strings, the first and second V-phase battery strings St6, St7 are used as the V-phase battery strings, and the first and second W-phase battery strings St8, St9 are used as the W-phase battery strings. The number of the U-phase battery strings, the V-phase battery strings, and the W-phase battery strings may be one or three or more.

In the present embodiment, ternary system (NMC) lithium-ion rechargeable batteries may be used for the batteries B of the first U-phase battery string St4, the first V-phase battery string St6, and the first W-phase battery string St8, and iron phosphate-based (LFP) lithium-ion rechargeable batteries may be used for the batteries B of the second U-phase battery string St5, the second V-phase battery string St7, and the second W-phase battery string St9; however, any type of lithium-ion rechargeable batteries may be used for each battery string St, and difference types of lithium-ion rechargeable batteries may be mixed.

The embodiments disclosed herein are to be considered to be illustrative and not restrictive in every respect. The scope of the disclosure is defined not by the detailed description of embodiments but by the claims, and is intended to cover all equivalents and all modifications within the scope of the claims.

What is claimed is:

1. A power supply system comprising:
   an alternating current sweep unit configured to output alternating current power from a first U-phase battery string, a first V-phase battery string, and a first W-phase battery string that are Y-connected; and
   a first power supply circuit configured to convert an output of a direct current sweep unit including a first battery string into alternating current power using an inverter to output alternating current power, wherein:
   each of the first U-phase battery string, the first V-phase battery string, the first W-phase battery string, and the first battery string includes a plurality of battery circuit modules connected in series;
   each of the battery circuit modules includes
      a battery, output terminals provided to output a voltage of the battery,
a first switch connected to the output terminals and connected in parallel to the battery, and
a second switch connected in series to the battery, the battery circuit modules each being configured such that the voltage of the battery is applied to the output terminals when the first switch is in an OFF state and the second switch is in an ON state; and
an output density of the battery included in the first battery string is higher than an output density of the battery included in the first U-phase battery string, the first V-phase battery string, and the first W-phase battery string.

2. The power supply system according to claim 1, wherein an energy density of the battery included in the first U-phase battery string, the first V-phase battery string, and the first W-phase battery string is higher than an energy density of the battery included in the first battery string.

3. The power supply system according to claim 1, wherein:
the battery included in the first battery string is a nickel-metal hydride battery; and
the battery included in the first U-phase battery string, the first V-phase battery string, and the first W-phase battery string is a lithium-ion battery.

4. The power supply system according to claim 1, further comprising a control device configured to control the alternating current sweep unit and the first power supply circuit,
wherein the control device is configured to output alternating current power from the first power supply circuit when a request power is larger than a first predetermined value.

5. The power supply system according to claim 4, wherein the control device is configured to output alternating current power from the alternating current sweep unit in addition to outputting the alternating current power from the first power supply circuit, when the request power is larger than a second predetermined value which is larger than the first predetermined value.

6. The power supply system according to claim 4, wherein:
the alternating current sweep unit and the first power supply circuit are configured to be electrically connected to an external power supply; and
the control device is configured to
control the alternating current sweep unit and the first power supply circuit to perform power adjustment on the external power supply by input and output power of the alternating current sweep unit and the first power supply circuit, and
control connection and disconnection between the alternating current sweep unit and the external power supply and connection and disconnection between the first power supply circuit and the external power supply depending on a response time and an adjustment time requested in the power adjustment.

7. The power supply system according to claim 1, wherein the alternating current sweep unit is configured such that the first U-phase battery string and a second U-phase battery string that are connected in parallel, the first V-phase battery string and a second V-phase battery string that are connected in parallel, and the first W-phase battery string and a second W-phase battery string that are connected in parallel are Y-connected to output alternating current.

* * * * *